United States Patent [19]
McClendon et al.

[11] Patent Number: 5,802,848
[45] Date of Patent: Sep. 8, 1998

[54] HYDRAULIC SYSTEM FOR MOTOR VEHICLE

[75] Inventors: Kevin Mark McClendon, Saginaw; James Leroy Davison, Freeland; Robert Edward Beyerlein, Saginaw; Tom Cheuk-In Wong, Saginaw; Allan Lee Dickinson, Saginaw; Albert Cheuk-Yin Wong, Saginaw; Carl David Tarum, Saginaw; James Michael Shea, Saginaw; David Fredrick Hammerbacher, Saginaw, all of Mich.

[73] Assignee: General Motors Corporation, Detroit, Mich.

[21] Appl. No.: 919,517

[22] Filed: Aug. 28, 1997

[51] Int. Cl.$^6$ .................................................. F16D 31/02
[52] U.S. Cl. ............................ 60/426; 60/468; 60/494
[58] Field of Search ............................ 60/468, 494, 420, 60/426

[56] References Cited

U.S. PATENT DOCUMENTS

| | | | |
|---|---|---|---|
| 4,414,809 | 11/1983 | Burris | 60/424 |
| 4,446,697 | 5/1984 | Goscenski, Jr. | 60/443 |
| 4,470,259 | 9/1984 | Miller et al. | 60/422 |
| 4,794,883 | 1/1989 | Fukami et al. | 123/41.12 |
| 4,798,050 | 1/1989 | Nakamura et al. | 60/329 |
| 5,319,932 | 6/1994 | Roche | 60/468 X |
| 5,398,505 | 3/1995 | Oogushi et al. | 60/426 |
| 5,456,077 | 10/1995 | Bartlett | 60/468 X |
| 5,471,838 | 12/1995 | Suzuki et al. | 60/494 X |
| 5,501,184 | 3/1996 | Engelsen et al. | 1234/41.29 |
| 5,535,845 | 7/1996 | Buschur | 180/417 |

*Primary Examiner*—Hoang Nguyen
*Attorney, Agent, or Firm*—Saul Schwartz

[57] ABSTRACT

A motor vehicle hydraulic system including a power steering pump, a reservoir, a steering assist fluid motor, and a second fluid motor for a radiator cooling fan. A flow control valve remote from the power steering pump divides the total fluid flow from the power steering pump into a high flow branch and a low flow branch. Fluid circulates in the low flow branch at a substantially constant flow rate for a proportional control valve for the steering assist fluid motor and returns to the reservoir through an unrestricted tubular boss on the reservoir. Fluid in the high flow branch issues as a jet stream from a nozzle on the reservoir into a venturi passage submerged in fluid in the reservoir. The venturi passage is connected to an inlet port of the power steering pump. The jet stream aspirates fluid from the reservoir into the venturi passage. The kinetic energy of the jet stream is converted into superatmospheric pressure at the inlet port of the power steering pump to suppress cavitation. Fluid from the low flow branch dwells in the reservoir for a time duration adequate for natural release therefrom of any entrained gas bubbles.

4 Claims, 2 Drawing Sheets

HYDRAULIC SYSTEM FOR MOTOR VEHICLE

TECHNICAL FIELD

This invention relates to a motor vehicle hydraulic system in which a single pump is the source of fluid for multiple hydraulically powered accessories of the vehicle.

BACKGROUND OF THE INVENTION

A motor vehicle hydraulic system typically includes a power steering pump such as described in U.S. Pat. No. 4,386,891, issued Jun. 7, 1983 and assigned to the assignee of this invention, driven by the vehicle's motor, a fluid reservoir at atmospheric pressure, and a steering assist fluid motor. A proportional control valve such as embodied in a power steering gear described in U.S. Pat. No. 4,454,801, issued Jun. 19, 1984 and assigned to the assignee of this invention, regulates a steering assist boost pressure and distributes such boost pressure to one of two working chambers of the steering assist fluid motor while at the same time connecting the other working chamber to the reservoir. An internal flow control valve of the power steering pump maintains a substantially constant discharge flow rate throughout a predetermined speed range of the power steering pump by recirculating a varying fraction of the discharge of the pump back to an inlet of the pump. The kinetic energy of the fluid recirculated to the pump inlet is converted to superatmospheric pressure at the pump inlet which minimizes the risk of cavitation at high pump speed. A power steering pump in a hydraulic system having an additional hydraulically driven accessory, e.g., a fluid motor for a radiator cooling fan, is more susceptible to cavitation because the flow control valve must remain closed over a significant fraction of the speed range of the power steering pump to assure satisfaction of the flow requirements of the entire hydraulic system.

SUMMARY OF THE INVENTION

This invention is a new and improved motor vehicle hydraulic system including a power steering pump, a reservoir, a steering assist fluid motor, and a second fluid motor for another accessory of the motor vehicle such as a radiator cooling fan. A flow control valve of the hydraulic system remote from the power steering pump divides the total fluid flow from the power steering pump into a high flow branch and a low flow branch. Fluid circulates in the low flow branch at a substantially constant flow rate. A proportional control valve for the steering assist fluid motor in the low flow branch regulates a steering assist boost pressure and distributes such boost pressure to the steering assist fluid motor. Fluid in the low flow branch returns to the reservoir with minimal turbulence through an unrestricted tubular boss on the reservoir. Fluid in the high flow branch issues as a jet stream from a nozzle on the reservoir into a passage in a venturi tube submerged in fluid in the reservoir. The venturi tube passage is connected to an inlet port of the power steering pump. The jet stream aspirates fluid from the reservoir into the venturi tube passage at a flow rate corresponding to the fluid flow rate in the low flow branch. The kinetic energy of the jet stream is converted into superatmospheric pressure at the inlet port of the power steering pump to suppress cavitation. Fluid from the low flow branch dwells in the reservoir for a time duration adequate for natural release therefrom of any entrained gas bubbles.

DESCRIPTION OF THE PREFERRED EMBODIMENT

Figure 1:
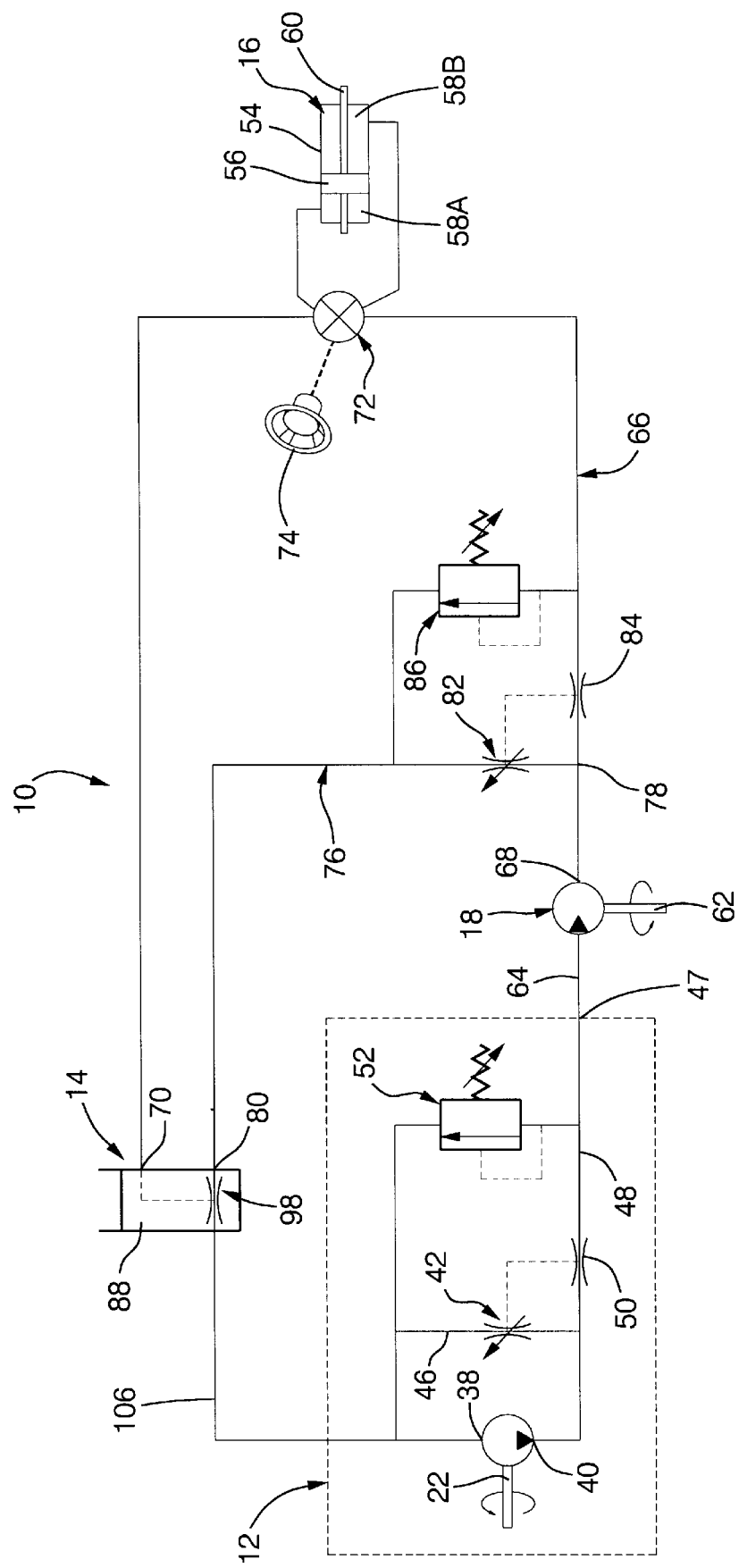
FIG. 1 is a schematic diagram of a motor vehicle hydraulic system according to this invention.

Referring to FIG. 1, a schematically-represented motor vehicle hydraulic system 10 according to this invention includes a power steering pump 12, a reservoir 14, a steering assist fluid motor 16, and a second fluid motor 18 suitable for operating another accessory of the motor vehicle such as a radiator cooling fan. As seen best in FIGS. 2–3, the power steering pump 12 includes a stationary housing 20, an input shaft 22 rotatably supported on the stationary housing, and a rotating group 24 between a non-rotating thrust plate 26 on the housing and a non-rotating pressure plate 28 on the housing. The input shaft 22 is rotatably supported on the housing 20 and the pressure plate 26 by a pair of bearings 30. An end 32 of the input shaft 22 outside of the stationary housing 20 is connected to a motor, not shown, of the motor vehicle such that the speed of the pump, i.e., the revolutions per minute (RPMs) of the input shaft 22, is proportional to the RPMs of an element, e.g., a crankshaft, of the motor.

Figure 3:
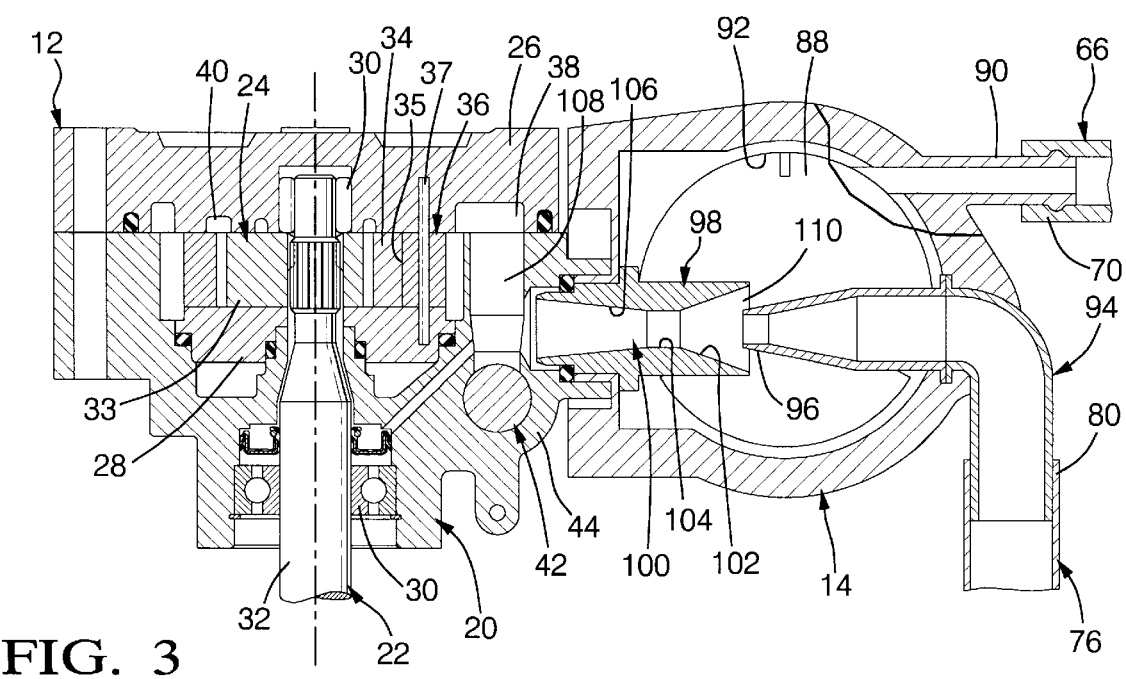
FIG. 3 is a sectional view taken generally along the plane indicated by lines 3—3 in FIG. 2.

The rotating group 24 of the power steering pump includes a rotor 33 rigidly attached to the input shaft 22 and a plurality of radially slidable vanes 34 on the rotor which cooperate with a cam surface 35 on a cam ring 36 nonrotatably secured to the housing 20 around the rotor by a plurality of dowel pins, only a single dowel pin 37 being visible in FIG. 3, and with the pressure plate 28 and the thrust plate 26 in defining a plurality of pump chambers, not shown, which expand and collapse as the rotor rotates with the input shaft 22. The expanding pump chambers sweep past a fragmentarily illustrated inlet port 38 of the power steering pump 12 in the thrust plate 26, and the collapsing pump chambers sweep past a fragmentarily illustrated discharge port 40 of the power steering pump in the thrust plate. For a more complete description of the structure and operation of the power steering pump 12, reference may be made to the aforesaid U.S. Pat. 4,386,891, the disclosure of which is incorporated herein by reference.

Figure 2:
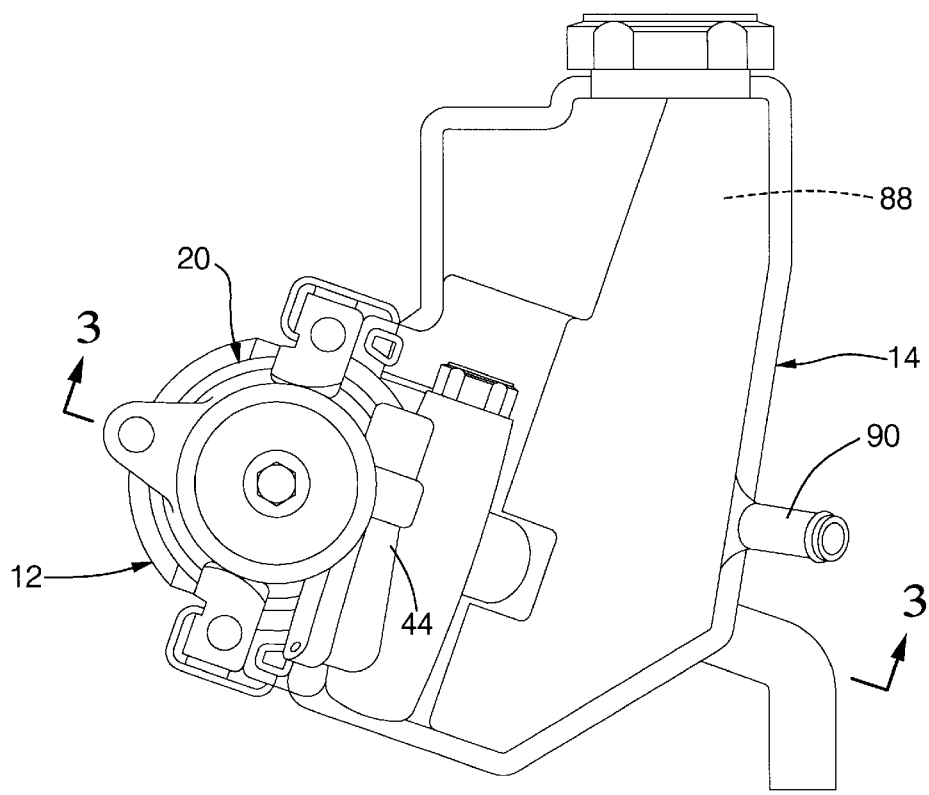
FIG. 2 is an elevational view of a power steering pump and a reservoir of the motor vehicle hydraulic system according to this invention.

The power steering pump 12 further includes a schematically represented internal flow control valve 42, FIG. 1, in a cylindrical boss 44, FIG. 2, on the stationary housing 20. As described fully in the aforesaid U.S. Pat. 4,386,891, the flow control valve 42 is disposed in an internal recirculation passage 46 in the stationary housing 20 between the discharge port 40 and the inlet port 38. When the flow control valve 42 is closed, all of the fluid expelled into the discharge port 40 is discharged from the power steering pump 12 through a schematically represented high pressure port 47 of the power steering pump connected to the discharge port 40 through an internal branch 48 of the recirculation passage 46.

The flow control valve 42 transitions progressively from closed to fully open in response to an increasing pressure gradient across a restriction 50 in the internal branch 48. As the flow control valve 42 opens, progressively more fluid recirculates from the discharge port 40 directly to the inlet port 38 to maintain the flow rate from the high pressure port 47 of the power steering pump substantially constant and to induce superatmospheric pressure at the inlet port 38 to suppress cavitation. When the flow control valve is closed, there is no recirculation to suppress cavitation. A schematically represented internal pressure relief valve 52 of the power steering pump opens only in extraordinary circumstances.

The steering assist fluid motor 16 may be an element of a motor vehicle rack and pinion power steering gear such as described in the aforesaid U.S. Pat. No. 4,454,801 and includes a stationary cylinder 54, a piston 56 dividing the cylinder into a pair of working chambers 58A, 58B, and a rod 60 rigidly attached to the piston and linked to dirigible wheels, not shown, of the motor vehicle such that back and forth linear translation of the rod steers the dirigible wheels. The second fluid motor 18 may have any conventional construction and includes a rotatable output shaft 62 adapted for driving connection to an accessory of the motor vehicle such as a radiator cooling fan. The second fluid motor is disposed in a fluid conduit 64 of the hydraulic system 10 through which flows all of the fluid discharged by the power steering pump 12 through the high pressure port 46 thereof and from which fluid energy is extracted to rotate the output shaft 62.

As seen best in FIG. 1, a second fluid conduit 66 has an upstream end 68 at the second fluid motor 18 and a downstream end 70 at the reservoir 14. A schematically represented proportional control valve 72 for the steering assist fluid motor 16 is disposed in the second fluid conduit 66 and may have the construction described in the aforesaid U.S. Pat. No. 4,454,801. In the absence of manual effort at a steering hand wheel 74 of the motor vehicle connected to the proportional control valve 72, fluid in the second conduit 66 flows with little restriction through the valve. When manual effort is applied at the steering hand wheel 74, the proportional control valve 72 throttles fluid flow in the second conduit 66 to create a steering assist boost pressure and directs the boost pressure to one of the working chambers 58A, 58B of steering assist fluid motor while at the same time maintaining a connection between the other of the working chambers 58A, 58B and the second conduit 66 downstream of the flow control valve.

A third fluid conduit 76 of the hydraulic system 10 has an upstream end 78 connected to the second fluid conduit 66 between the second fluid motor 18 and the proportional control valve 72 and a downstream end 80 at the reservoir 14. A flow control valve 82 of the hydraulic system 10 in the third fluid conduit 76 remote from the power steering pump 12 transitions progressively from closed to fully open in response to an increasing pressure gradient across a restriction 84 in the second fluid conduit 66 downstream of the third fluid conduit. As the remote flow control valve 82 opens, progressively more fluid bypasses the proportional control valve 72 and flows toward the reservoir 14 through the third fluid conduit. A schematically represented pressure relief valve 86 parallel to the remote flow control valve 82 limits the maximum fluid pressure in the second fluid conduit downstream of the third fluid conduit and opens only in extraordinary circumstances.

The fluid flow in the conduit 64 through the second fluid motor 18 consists of the total flow discharged from the power steering pump 12 through the high pressure port 46 thereof. The remote flow control valve 82 is calibrated to divide the fluid flow from the conduit 64 into a constant flow rate fraction in the second fluid conduit 66 downstream of the third fluid conduit and a variable flow rate fraction in the third fluid conduit 76. The fluid flow rate of the constant flow rate fraction is consistent with the flow requirements of the steering assist fluid motor 16 and is typically about 2.6 gallons per minute. The fluid flow rate of the variable flow rate fraction is constituted by the remainder of the fluid from the high pressure port of the power steering pump and varies with the speed of the input shaft 22 of the power steering pump in the range of input shaft speed when the internal flow control valve 42 of the power steering pump is closed. The fluid flow rate of the variable flow rate fraction typically may range between about 2.6 gallons per minute and 15 gallons per minute. Because the constant flow rate fraction is always substantially less than the variable flow rate fraction, the second conduit 66 constitutes a low flow branch of the hydraulic system 10 and the third conduit 76 constitutes a high flow branch of the hydraulic system.

As seen best in FIGS. 2–3, the downstream end 70 of the second conduit 66 communicates with an internal chamber 88 of the reservoir 14 at atmospheric pressure through a first return port defined by an unrestricted tubular boss 90 on the reservoir substantially tangent to a wall 92 of the internal chamber. The downstream end 80 of the third conduit 76 communicates with the internal chamber 88 of the reservoir through a second return port defined by a tubular elbow 94 on the reservoir having a restriction defining a nozzle 96 at an end of the elbow. A venturi tube 98 on the reservoir is submerged in fluid in the internal chamber 88 and has a passage 100 therein including a convergent portion 102, a throat 104, and a diffuser portion 106. The venturi passage 100 communicates with inlet port 38 of the power steering pump 12 through a passage 108 in the stationary housing 20. The nozzle 96 is aimed at the throat 104 of the passage 100 in the venturi tube.

In operation, the constant flow rate fraction of the total flow from the high pressure port 47 of the power steering pump circulates through the low flow branch of the hydraulic system 10 and through the proportional control valve 72 and discharges into the internal chamber 88 of the reservoir 14 through the tubular boss 90. Because of the relatively low flow rate in the low flow branch and the tangency of the tubular boss with the wall 92 of the internal chamber, return flow into the reservoir through the tubular boss 90 induces only negligible turbulence.

At the same time, the variable flow rate fraction of the total flow from the high pressure port 47 of the power steering pump circulates through the high flow branch of the hydraulic system 10 and discharges into the internal chamber 88 of the reservoir 14 through the nozzle 96 at the end of the elbow 94. Because of the relatively high flow rate in the high flow branch, the nozzle 96 directs a jet stream of return fluid into the passage 100 in the venturi tube 98 across a submerged gap 110 between the nozzle and the convergent portion 102 of the venturi tube passage. The jet stream aspirates make-up fluid flow from the internal chamber 88 into the venturi tube passage 100 at a flow rate corresponding to the flow rate in the low flow branch of the hydraulic system 10. The kinetic energy of the jet stream is converted into superatmospheric fluid pressure in the diffuser portion 106 of the venturi tube passage 100 and in the inlet port 38 of the power steering pump 12, which superatmospheric fluid pressure suppresses cavitation at the inlet port.

Importantly, fluid from the low flow branch dwells in the internal chamber 88 of the reservoir for a time duration sufficient for entrained gas bubbles therein to escape naturally before the fluid is aspirated from the internal chamber into the venturi tube passage 100 by the jet stream of return fluid in the high flow branch. Since all of the fluid in the hydraulic system 10 eventually circulates through the low flow branch and thus becomes deaerated, the hydraulic system 10 becomes substantially fully deaerated.

Having thus described the invention, what is claimed is:

1. In a hydraulic system for a motor vehicle including a steering assist fluid motor, a second fluid motor for an accessory of said motor vehicle, a power steering pump having an inlet port and a high pressure port and a total fluid flow rate from said high pressure port at least equal to a combined maximum fluid flow requirement of said steering assist fluid motor and said second fluid motor, a fluid reservoir at atmospheric pressure, a conduit means connecting said high pressure port of said power steering pump to each of said steering assist fluid motor and said second fluid motor, and a flow control valve in said conduit means remote from said power steering pump and upstream of said steering assist fluid motor operative to divide said conduit means into a low flow branch of said hydraulic system having a substantially constant fluid flow rate therein corresponding to the maximum fluid flow requirement of said steering assist fluid motor and a high flow branch of said hydraulic system having a fluid flow rate therein exceeding said fluid flow rate in said low flow branch and constituting the remainder of said total fluid flow rate from said high pressure port of said power steering pump, the improvement comprising:

a first return port means on said reservoir connected to said low flow branch of said hydraulic system operative to introduce into an internal chamber of said reservoir fluid flowing in said low flow branch, a venturi means operative to define a venturi passage between said internal chamber of said reservoir and said inlet port of said power steering pump including a convergent portion submerged in fluid in said internal chamber in said reservoir and a diffuser portion and a throat between said convergent portion and said diffuser portion, and a second return port means on said reservoir connected to said high flow branch of said hydraulic system operative to introduce said fluid flowing in said high flow branch into said internal chamber of said reservoir as a jet stream aimed at said throat of said venturi passage thereby to aspirate fluid into said venturi passage through said convergent portion thereof from said internal chamber of said reservoir, the kinetic energy of said jet stream being converted into superatmospheric pressure in said diffuser portion of said venturi passage and in said inlet port of said power steering pump to suppress cavitation, said fluid introduced into said internal chamber of said reservoir through said first return port means dwelling in said internal chamber for a time duration sufficient for natural separation from said fluid of entrained gas bubbles before said fluid is aspirated into said venturi tube passage by said jet stream aimed at said throat of said venturi tube passage.

2. The motor vehicle hydraulic system recited in claim 1 wherein said first return port means on said reservoir comprises:

a passage on said reservoir connected to said low flow branch of said hydraulic system intersecting said internal chamber of said reservoir substantially tangent to a wall of said internal chamber.

3. The motor vehicle hydraulic system recited in claim 1 wherein said second return port means on said reservoir comprises:

a tube on said reservoir connected to said high flow branch of said hydraulic system having a restriction at an end thereof defining a nozzle aimed at said throat of said venturi passage.

4. The motor vehicle hydraulic system recited in claim 3 wherein said venturi means comprises:

a venturi tube mounted on said reservoir having formed therein said venturi passage including said convergent portion and diffuser portion and said throat between said convergent portion and said diffuser portion.

* * * * *